(No Model.)

G. L. MINOTT.
MULTIPLYING ATTACHMENT FOR PHOTOGRAPHIC CAMERAS.

No. 592,934. Patented Nov. 2, 1897.

Witnesses
Arthur H. Randall
M. C. Crossley

Inventor
Geo. L. Minott
By A. W. Crossley, atty.

THE NORRIS PETERS CO., PHOTO-LITHO., WASHINGTON, D. C.

UNITED STATES PATENT OFFICE.

GEORGE L. MINOTT, OF GARDNER, MASSACHUSETTS.

MULTIPLYING ATTACHMENT FOR PHOTOGRAPHIC CAMERAS.

SPECIFICATION forming part of Letters Patent No. 592,934, dated November 2, 1897.

Application filed July 23, 1896. Serial No. 600,236. (No model.)

*To all whom it may concern:*

Be it known that I, GEORGE L. MINOTT, of Gardner, in the county of Worcester and State of Massachusetts, have invented certain new and useful Improvements in Multiplying Attachments for Photographic Cameras, of which the following is a description sufficiently full, clear, and exact to enable those skilled in the art to which it appertains or with which it is most nearly connected to make and use the same.

My invention relates to multiplying attachments for photographic cameras, or to that class of cameras which embody in their construction mechanism whereby a multiplicity of exposures may be made upon one plate or other sensitized surface.

The object of my invention is to provide in a photographic camera improved means whereby a multiplicity of exposures may be made upon a plate or other sensitized surface to produce a composite picture which is the result of several exposures taken at different times upon different portions of the plate or the like and in which the different exposures are caused to overlap at their adjacent edges, so as to blend the said several exposures into one united whole and entirely avoid the line or lines of demarcation heretofore occurring under similar circumstances between the different exposures.

To these ends the invention consists in certain new and useful features of construction and combinations of parts, all as is hereinafter more fully set forth and described in the following description, after which the novel features are particularly pointed out and clearly defined in the claims.

In the description reference is had to the accompanying drawings and to the letters of reference marked thereon, like letters designating the same parts wherever they occur throughout the several views.

Figure 1:
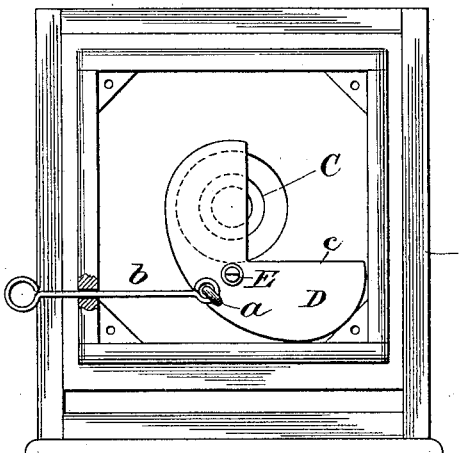
Figure 2:
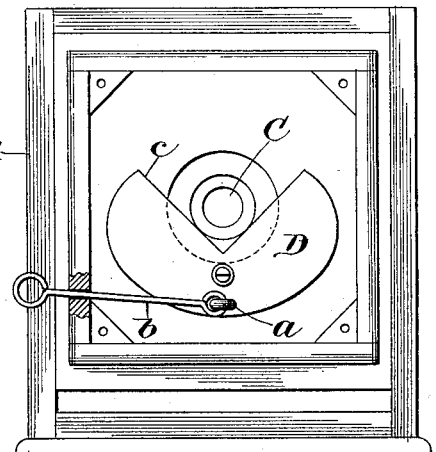
Figure 3:
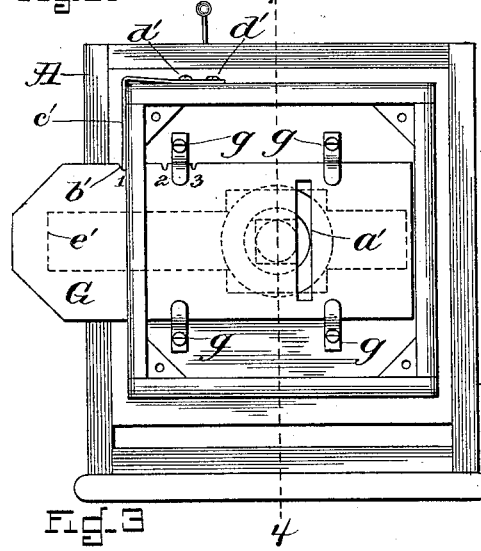
Figures 4, 5:
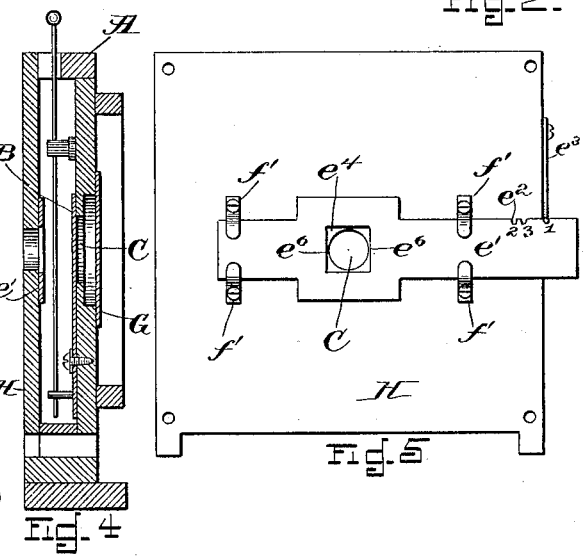
Figure 6:
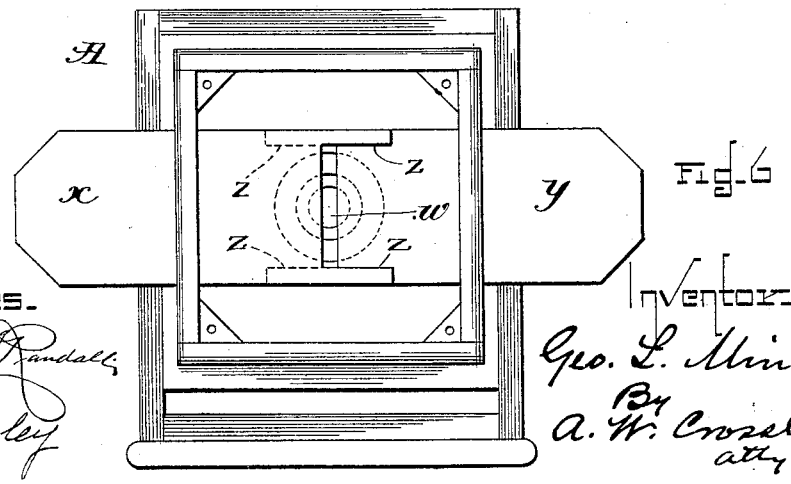

Of the drawings, Figure 1 is an elevation of a portion of a photographic camera embodying one form of my invention. Fig. 2 is a similar view, but showing the parts in a different position. Fig. 3 is an elevation of a portion of a photographic camera embodying another form of my invention. Fig. 4 is a section on line 4 4 of Fig. 3. Fig. 5 is a detail of a portion shown in Fig. 4. Fig. 6 is a modification.

Proceeding to a description of my invention and the manner of applying and using the same, reference is had to the accompanying drawings, in which—

Fig. 1 shows a portion of an ordinary photographic camera embodying my invention. At A is the frame of the head of a camera, in which is mounted the usual shutter B, that is constructed and operated in the usual manner and adapted to open and close the opening or lens-tube C, through which the rays of light enter to the lens. Mounted upon the frame A, I provide a second shutter or shield D, pivoted at E, which is provided with an eye $a$, to which is hooked the inner extremity of a link $b$, as shown. The said link $b$ extends outside beyond the head A, so as to be easily grasped, and by means of which the shield D may be swung upon its pivot E. The shield D is cut away, as shown at $c$, so as to form a V-shaped notch which, when the shield is in either extreme of its positions, will leave open a little less than half of the opening C, through which the rays of light are free to pass to the lens. If the shutter or shield covered only half of the opening C, a great deal more space upon the field would be exposed than would be required to properly overlap the different exposures, so that by constructing the shield so as to cover slightly more than half of the opening C the requisite amount of overlapping of the different exposures at their adjacent edges is obtained.

By placing the shutter or shield in the position shown in Fig. 2 the entire field may be utilized at one exposure when desired.

By means of the mechanism just described two exposures only can be made upon the field. Where it is desired to make more than two—for instance, three or more—exposures, I employ the following mechanism: Mounted in the head A to slide transversely with relation to the opening C, I provide a slide or shield G, which has formed therein the vertical slot $a'$. This slide projects out beyond the head A, so as to be easily grasped, and at its upper edge is notched, as at $b'$, and the said notches are engaged by the extremity of a leaf-spring or spring-pawl $c'$, secured by means of screws $d'\ d'$ to the adjacent framework of the head. The spring through its engagement with the notches serves as a stop and to hold the slide in proper position with relation to the opening C, preventing any shifting of the slide when the latter is placed for an exposure, while the notches may be numbered and serve as an index for locating the slide for the different exposures. Clips $g$ $g$, secured to the framework and overlying the slide, support and hold the latter securely in place against the frame.

The slide G is shown as provided with three notches, the number required for three exposures, and the said notches are numbered to indicate by engagement of the spring $c'$ therewith the position of the slide at the time of each exposure.

Owing to the peculiar manner in which the rays of light pass through the lens, the same sized or width of slot, when placed in various positions with relation to the opening C, will expose portions of the field or plate of varying areas, and in order to compensate for this and cause the several exposures upon the field or plate to be all of the same size I employ what I shall for convenience term an "auxiliary" slide or shield.

The auxiliary slide or shield is shown at $e'$ and is mounted to slide in clips $f'$ $f'$, secured, preferably, to the inner side of the face-plate H of the head A. The auxiliary slide or shield is adapted to be moved transversely with relation to the opening C and projects outside beyond the head A, as shown, and is formed with notches $e^2$, which are engaged by a leaf-spring or spring-pawl $e^3$. The notches serve as an index and may be numbered to indicate the position of the auxiliary slide at the time of each exposure, in order that the said slide may be in the proper position with relation to the slide G at such times. The auxiliary slide is formed with a square opening $e^4$, the sides $e^6$ of which are adapted to be drawn over the opening C to partly close the same upon either side thereof, as the case may be, when more than the necessary space upon the field or sensitive plate is exposed by the slot $a'$ formed in the slide G.

In Fig. 6 I have shown a modification in which the slide G and auxiliary slide $e'$ are substituted by duplicate slides or shields $x$ and $y$, formed with a cut-away portion $z$, which, when the slides are mounted in the head A side by side, may be arranged to leave an opening $w$ therethrough. By moving the slides $x$ and $y$ together with relation to the opening C different portions of the field may be exposed, and by moving the said slides relatively to each other the size of the opening $w$ and the area of the exposure upon the field increased or diminished at will. Thus it will be seen that by placing the slides or shields G and $e'$ in their proper relative positions for each exposure, as well as in their proper position with relation to the field, they may be so placed at such times as to cause only the requisite amount of overlapping of the exposures at their adjacent edges.

Having now particulary described and ascertained the nature of my invention and the manner of constructing and using the same, what I claim is—

1. In a multiplying attachment for photographic cameras, the combination with the lens-tube of a movable shield or shutter G formed with a cut-away portion provided with a transverse slot combined with an independent auxiliary shield to control the extent or area of said slot, and stops to positively limit or fix the degree of movements of the shield or shutter at exactly predetermined points, whereby portions of the field of view may be exposed successively and the several exposures caused to overlap at their adjacent edges without indicating lines of connection or joinder, as set forth.

2. In a multiplying attachment for photographic cameras, the combination, with the lens-tube, of a movable shield or shutter G formed with a cut-away portion consisting of a transverse slot and provided with a series of notches along one edge, means to engage the said notches to constitute positive stops in the movement of the shield or shutter, and an auxiliary shield $e'$ to control the extent or area of the said slot in the shield or shutter G, whereby portions of the field of view may be exposed successively and the several exposures be caused to overlap at their adjacent edges without indicating lines of connection or joinder, as set forth.

3. A multiplying attachment for photographic cameras comprising a movable slide or shield G formed with a cut-away portion consisting of a transverse slot, and provided with a series of notches along one edge; a pawl engaging said notches, and an independently-movable auxiliary slide $e'$, substantially as described.

4. A multiplying attachment for photographic cameras comprising a movable slide or shield G formed with a cut-away portion consisting of a transverse slot, and provided with a series of notches along one edge, a pawl engaging said notches, and an independently-movable auxiliary slide $e'$, also having notches formed along one edge thereof, and a pawl engaging said last-mentioned notches, substantially as described.

5. A multiplying attachment for photographic cameras comprising a movable slide or shield formed with a cut-away portion consisting of a transverse slot, having notches $b'$ $b'$ along one edge thereof, and a pawl $c'$ enengaging said notches, substantially as described.

In testimony whereof I have signed my name to this specification, in the presence of two subscribing witnesses, this 21st day of July, A. D. 1896.

GEORGE L. MINOTT.

Witnesses:
ARTHUR F. RANDALL,
ARTHUR W. CROSSLEY.